United States Patent

[11] 3,568,912

| [72] | Inventor | John de Simas |
| | | 960 Hillcrest, Millbrae, Calif. 94030 |
| [21] | Appl. No. | 761,272 |
| [22] | Filed | Sept. 20, 1968 |
| [45] | Patented | Mar. 9, 1971 |

[54] REINFORCED PALLETIZED CARGO CONTAINERS
5 Claims, 3 Drawing Figs.

[52] U.S. Cl............................................. 229/23,
108/55, 206/45.19, 206/60
[51] Int. Cl........................................................ B65d 13/00
[50] Field of Search............................................. 206/60
(Pallet), 45.19; 312/140.3, 140.4; 108/55; 229/23
(B)

[56] References Cited
UNITED STATES PATENTS

| 2,685,398 | 8/1954 | King.............................. | 229/6 |
| 3,442,434 | 5/1969 | DeSimas....................... | 229/23(B) |
| 2,321,473 | 6/1943 | Ferguson...................... | 206/45.19 |
| 2,644,602 | 7/1953 | Ross............................. | 229/23(B)X |
| 2,664,219 | 12/1953 | Schmidt ....................... | 108/55X |
| 2,765,112 | 10/1956 | Derman........................ | 229/23(B) |
| 2,719,664 | 10/1955 | Hester.......................... | 229/23(B) |
| 2,775,389 | 12/1956 | Weiner......................... | 229/23(B) |
| 2,925,978 | 2/1960 | Marso .......................... | 108/55X |
| 3,421,678 | 1/1969 | Thompson et al. ........... | 229/3.1 |

Primary Examiner—Joseph R. Leclair
Assistant Examiner—Steven E. Lipman
Attorney—Townsend and Townsend ABSTRACT: Reinforced cardboard palletized cargo containers having a container portion with cutouts at the bottom of the sidewalls for receiving the tines of a forklift truck. The cutouts include vertical flaps extending into the container from the sides of the cutouts for positioning on the flaps a flat base on which packaged goods are placed. An elongate U-shaped bracket extends over the upper edge of the cutouts frictionally engaging the sidewalls of the container. The brackets provide a durable bearing surface for the tines of a forklift truck and include a flat edge extending into the container above the flat base on which packaged goods rest for positioning the base between the flat edge of the bracket and the cutout flaps of the container walls.

PATENTED MAR 9 1971
3,568,912
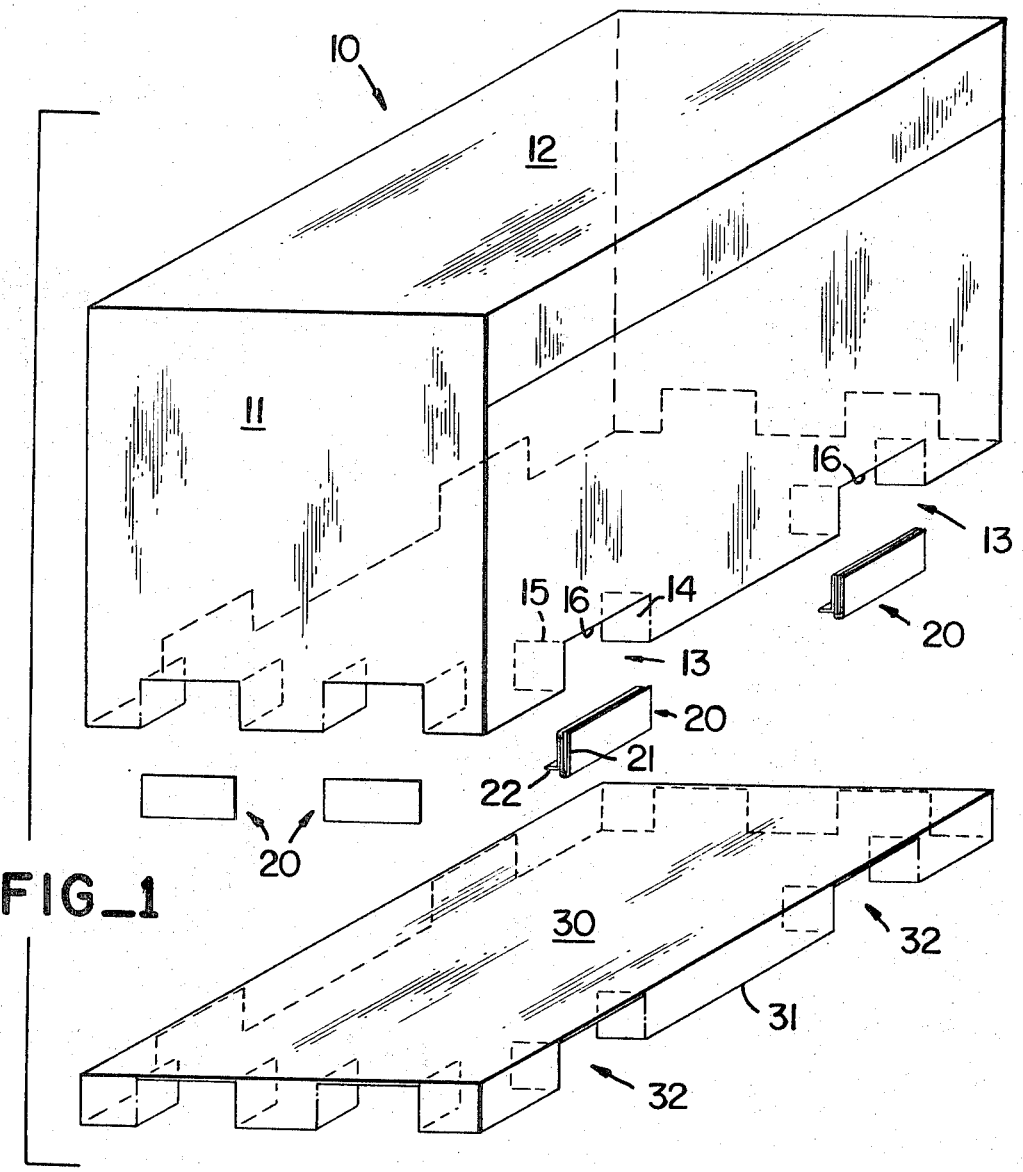
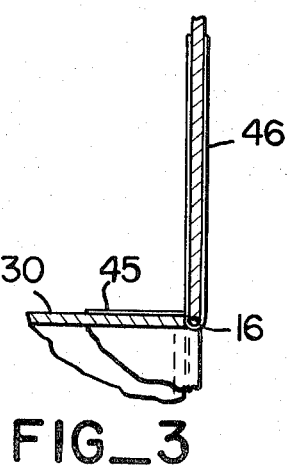
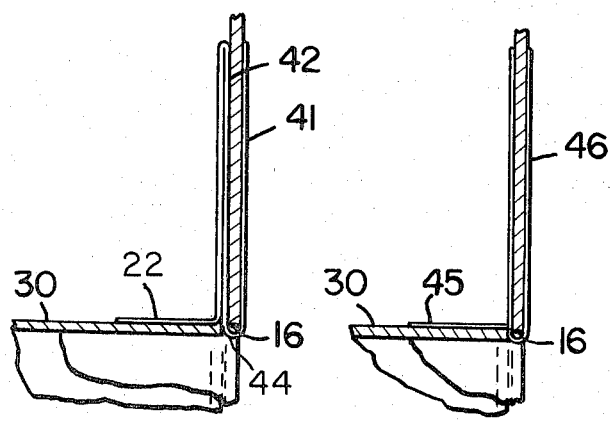
INVENTOR.
John de Simas
BY
Townsend and Townsend
ATTORNEYS

REINFORCED PALLETIZED CARGO CONTAINERS

This invention relates to new and improved reinforced palletized cargo containers and reinforcing brackets for cardboard pallets and cardboard palletized cargo containers.

It is an object of the present invention to provide a reinforcing bracket which forms a resistance bearing surface for the tines of a forklift truck and to provide reinforced cardboard palletized cargo containers having cutouts in the bottom of the sidewalls for receiving the tines of the forklift truck.

Another object of the invention is to provide a reinforcing bracket for cardboard palletized cargo containers which provide a positioning edge for positioning the flat base of the container upon which packaged goods are placed.

A further object of the invention is to provide a reinforcing bracket which may be easily custom made to various sizes for application with custom made cardboard palletized cargo containers.

In order to accomplish these results the present invention contemplates providing a corrugated cardboard palletized cargo container of the type having a container portion with four sidewalls and a top. The container portion may or may not have a bottom and includes cutouts at the bottom of the sidewall portions for receiving the tines of a forklift truck. The cutouts include vertical flaps extending inwardly from the sides of each cutout, upon which a flat base rests, spaced by the flaps from the ground or the bottom of the container portion.

A reinforcing bracket is provided in the form of a flat U-shaped strip of hard material adapted to slide over the upper edge of each of the cutouts and frictionally engage the side wall of the container portion. The reinforcing bracket provides a resistant bearing surface for the tines of a forklift truck. Each of the brackets also include a flat projecting edge, projecting at right angles from the flat U-shaped strip into the container. The projecting edge is spaced from the bottom of the U-shaped strip a distance approximately equal to the thickness of a flat base positioned in the container upon which the shipped goods rest. Thus, the flat base is held between the inwardly extending flaps from the cutouts and the projecting edge of the bracket. The flat base serves to retain the U-shaped bracket over the upper edge of the cutout portions. Additional spacing means can be provided between the flat base and the ground or the bottom of the container portion.

Other objects, features and advantages will become apparent in the following specification and accompanying drawings.

FIG. 1 is an exploded perspective view of a palletized cargo container embodying the present invention.

FIG. 2 is a side cross-sectional view of a reinforcing bracket embodying the present invention.

FIG. 3 is an alternate embodiment of the reinforcing bracket.

In the embodiment of the present invention illustrated in FIG. 1 there is shown a palletized cargo container consisting of a container portion 10 formed by four sidewalls 11 and a top 12. Each of the sidewalls 11 is provided with cutouts 13 at the bottom of the sidewall adapted to receive the tines of a forklift truck. Each of the cutouts includes a pair of vertical flaps 14 and 15 extending into the container from the side edges of the cutout. A reinforcing bracket 20 is provided for each cutout in the container portion sidewall. The reinforcing bracket is formed by a U-shaped strip 21 of hard material formed to slide over the upper edge 16 of a cutout and frictionally engage the sidewall 11 of the container portion. The bracket 20 thereby forms a resistant bearing surface for the tines of a forklift truck. Extending inwardly from the flat U-shaped strip 21 of the bracket 20 is a flat projecting edge 22 extending at right angles from the strip 21 into the container 10. The projecting edge 22 is spaced a distance from the bottom edge of the U-shaped bracket a distance approximately equal to the thickness of a flat base 30 on which goods to be shipped in the container are placed. The container 10 slides over the flat base 30 and the flaps are pushed inwardly so that the base 30 is positioned above the flaps 14 and 15 of each of the cutouts but adjacent and beneath the projecting edge 22 of each of the reinforcing brackets. In the embodiment shown in FIG. 1, the flat base 30 is provided with a skirt or depending edge 31 having cutouts with flaps complementary in shape and size to the cutouts in the container sidewall portion. The depending edge 31 provides additional spacing means between the flat base 30 and the ground.

In alternative embodiments of the invention, the cargo container 10 can be provided with a bottom. In that event the flat base on which the goods to be shipped are placed is inserted into the container from the top to rest on the inwardly extending flaps. Additional spacing blocks or other spacing means can be provided between the flat base and the bottom of the container. According to another embodiment, the flat base is a simple planar sheet without a depending edge. Certain other types of cargo containers with which the reinforcing bracket described above may be used are set forth in my U.S. Pat. application Ser. No. 702,649 filed on Feb. 2, 1968 and entitled "Cargo Containers" now U.S. Pat. No. 3,480,196.

As illustrated in FIG. 2, the reinforcing bracket can be formed from a single sheet of flexible material first bent into a U-shaped strip having legs 41 and 42. The leg 42 is considerably longer and is folded back upon itself to form the projecting edge 22. The projecting edge 22 is spaced a distance from the bottom 44 of the U-shaped strip a distance approximately equal to the thickness of a flat base positioned in the container and upon which the goods to be shipped are placed.

As shown in FIG. 3, the projecting edge 45 is a separate piece of material connected or welded to the U-shaped strip 46 with similar spacing from the bottom of the strip.

The reinforcing bracket can be made of a suitable hard and durable material such as metal or plastic. If the bracket is made of metal, the projecting edge 45 can be formed by simply cutting three sides of a window in one side of the U-shaped strip 46 and folding the cutout from the window down along its lower edge so that it extends into the container and is suitably spaced from the bottom of the bracket. The container for which the bracket is intended is made of corrugated cardboard, solid fiber board, or other paper products. The term "cardboard" as used herein and in the following claims is intended to include these various paper products.

A feature of the container embodiment described herein is that the walls of the container extending below the flat base can be readily waterproofed by dipping the lower portion of the container in a waterproofing material such as, for example, a plastic or wax base waterproofing solution. The lower portions of the wall which support the container on the ground are thereby impregnated with the waterproofing material for weather resistance and longer life. Though such waterproofing is particularly suited for the bottomless container portion described herein, it is also applicable to cardboard containers having a bottom connecting the lower ends of the sidewalls of the container portion.

I claim:

1. A reinforced palletized cargo container comprising: a cardboard container portion having a plurality of sidewalls with cutouts at the bottom of at least one sidewall formed to receive the tines of a forklift truck, said cutouts having vertical flaps extending from the side of the cutouts into the container portion; a flat base positioned in the container portion supported by said inwardly extending flaps; additional supporting means comprising a depending edge extending downwardly around the periphery of the flat base, said depending edge having cutouts therein with flaps complementary in size and shape to the inwardly extending flaps from the sidewalls of the container portion; and reinforcing means providing a hard bearing surface along the upper edge of the cutouts in the container sidewall for the tines of a forklift truck.

2. A reinforced palletized cargo container comprising: a cardboard container portion having a plurality of sidewalls with cutouts at the bottom of at least one sidewall formed to receive the tines of a forklift truck, said cutouts having vertical flaps extending from the sides of the cutouts into the container portion, a flat base positioned in the container portion above said inwardly extending flaps; and a plurality of reinforcing brackets, each said bracket comprising a flat U-shaped strip of hard material closed at the bottom and open at the top for sliding over the upper edge of cutouts in the sidewalls of the container portion and frictionally engaging the side walls, each said bracket also having a flat projecting edge extending into the container portion from the flat U-shaped strip of material, said flat projecting edge spaced from the bottom of the U-shaped strip of material, a distance approximately equal to the thickness of the flat base, whereby said flat projecting edge rests on the upper surface of the flat base, the flat base being positioned between said flat projecting edge and the inwardly extending flaps from cutouts in the side walls of the container portion.

3. A reinforced palletized container as set forth in claim 2 wherein additional spacing means are provided between the flat base and the bottom of the container portion.

4. A reinforced palletized container as set forth in claim 3 wherein said additional spacing means comprises a depending edge extending downwardly around the periphery of the flat base, said depending edge having cutouts therein with flaps complementary in size and shape to the inwardly extending flaps from the sidewalls of the container portion.

5. In a palletized cargo container of the type having a cardboard container portion including sidewalls having cutouts at the bottom of at least one sidewall thereof for receiving the tines of a forklift truck, said cutouts having vertical flaps extending into the container from the sides of the cutouts, and a flat base positioned in the container portion over the inwardly extending flaps on which goods to be shipped are placed, the improvement comprising: a flat, U-shaped strip of hard material having a closed bottom and an open top formed to slide over the upper edge of the cutouts and frictionally engage the sidewalls of the container portion, said bracket also having a flat protecting edge extending at right angles from the U-shaped strip into the container portion, said flat projecting edge spaced from the closed bottom of the U-haped strip a distance approximately equal to the thickness of the flat base upon which packaged goods rest, whereby said flat base is positioned between the projecting edge of the bracket and the inwardly extending flaps of the cutouts.